UNITED STATES PATENT OFFICE.

BOTHO SCHWERIN, OF FRANKFORT-ON-THE-MAIN, GERMANY, ASSIGNOR TO GESELLSCHAFT FÜR ELEKTRO-OSMOSE M. B. H., OF FRANKFORT-ON-THE-MAIN, GERMANY, A CORPORATION.

DIAPHRAGM FOR ELECTROLYTICAL AND ELECTRO-OSMOTICAL PURPOSES.

1,252,185.  Specification of Letters Patent.  Patented Jan. 1, 1918.

No Drawing.   Application filed January 4, 1913.  Serial No. 740,260.

*To all whom it may concern:*

Be it known that I, BOTHO SCHWERIN, a subject of the German Emperor, and residing at Frankfort-on-the-Main, Germany, have invented certain new and useful Improvements in Diaphragms for Electrolytical and Electro-Osmotical Purposes, of which the following is a specification.

My invention relates to improvements in diaphragms for electrolytical and electro-osmotical purposes.

The diaphragms hitherto used are made of one material only. For example, in the application Serial No. 703473 I have described a diaphragm for electrolytical and electro-osmotical purposes comprising a molded article of carborundum in a porous, coherent form, substantially free from impurities and binding media, which can be used for electrolytical purposes, in which case at one side of the diaphragm there may be an acid and at the opposite side an alkaline electrolyte. Furthermore such diaphragm may be used for treating colloidal, soluble or finely subdivided matter and especially for the separation of adsorbed substances from the adsorbents by means of electro-osmosis according to the method described in my Spanish Patent No. 53,607.

I have found that for many electrolytical and electro-osmotical purposes it is preferable to use diaphragms consisting of two or more materials. By using such diaphragms in the electro-osmotical process for separating of adsorbed substances from the adsorbents, there may be obtained a fractionation of the substances to be separated according to their degree of potential, by suitable selection of the materials used for the diaphragms.

The nature of the diaphragm may vary in respect to its potential according to the material from which it is made. For example a diaphragm made of alumina (corundum) is electropositive, one of silica may be regarded as negative, while one of carborundum is also electronegative but less strongly so than one of silica. I have found, that any desired degree of potential for the diaphragm, even a zero potential as compared with water, may be obtained by making the diaphragm of a mixture of different substances.

By using a diaphragm consisting for example of a mixture of carborundum and corundum, it is possible to separate tungsten as a tungstate in a pure state from the raw material.

In a vessel filled with distilled water, a diaphragm formed from a mixture of carborundum and emery (corundum) is placed, and around this cell a cathode of platinum wire is firmly fastened. In the cell, a diaphragm of aluminum oxid having a positive polarity is placed and the cell filled with distilled water. This cell contains the anode. If a colloidal solution of tungsten metal is placed in the cell formed of carborundum and emery, and the electric circuit is closed the alkaline particles will pass through the diaphragm last mentioned into the cathode space and acid impurities will pass into the anode space. The purified metallic tungsten will not pass through the cells or diaphragms.

What I claim is:

1. A diaphragm for electrolytical and electro-osmotic purposes comprising a molded article of carborundum and corundum in a porous, coherent form, substantially free from impurities and oxidation products.

2. A diaphragm for electrolytical and electro-osmotic purposes comprising a molded article of carborundum and corundum made up of particles of a colloidal nature in a porous coherent and refractory form, substantially free from impurities and binding media.

In testimony whereof I affix my signature in presence of two witnesses.

BOTHO SCHWERIN.

Witnesses:
JEAN GRUND,
CARL GRUND.